United States Patent
Casanelles Moix et al.

(10) Patent No.: US 10,239,216 B2
(45) Date of Patent: Mar. 26, 2019

(54) SYSTEM FOR HANDLING WORKPIECES IN A PRESS LINE

(71) Applicant: ABB SCHWEIZ AG, Baden (CH)

(72) Inventors: Ramon Casanelles Moix, Sant Cugat del Valles (ES); José Ruiz González, Manresa (ES)

(73) Assignee: ABB SCHWEIZ AG, Baden (CH)

( * ) Notice: Subject to any disclaimer, the term of this patent is extended or adjusted under 35 U.S.C. 154(b) by 47 days.

(21) Appl. No.: 14/436,421

(22) PCT Filed: Oct. 16, 2012

(86) PCT No.: PCT/EP2012/070471
§ 371 (c)(1),
(2) Date: Apr. 16, 2015

(87) PCT Pub. No.: WO2014/060021
PCT Pub. Date: Apr. 24, 2014

(65) Prior Publication Data
US 2015/0246446 A1   Sep. 3, 2015

(51) Int. Cl.
*B25J 9/00*   (2006.01)
*B25J 15/00*   (2006.01)

(52) U.S. Cl.
CPC ........... *B25J 15/0052* (2013.01); *B25J 9/009* (2013.01)

(58) Field of Classification Search
CPC .... B21D 43/052; B21D 43/105; B21D 43/18; B25J 9/009; B25J 9/1682; B25J 15/0052; B25J 15/0616

(Continued)

(56) References Cited

U.S. PATENT DOCUMENTS 5,159,827 A    11/1992  Shiraishi et al.
5,452,981 A *  9/1995  Crorey .................. B21D 43/05
                                                              100/207

(Continued)

FOREIGN PATENT DOCUMENTS

DE    102004012592 A1   9/2005
EP         1623773          2/2006

(Continued)

OTHER PUBLICATIONS

Machine Translation of JP 2009-208080, Retrieved Nov. 14, 2016.*

(Continued)

*Primary Examiner* — Saul Rodriguez
*Assistant Examiner* — Brendan P Tighe
(74) *Attorney, Agent, or Firm* — Peter B. Scull; Hamilton, DeSanctis & Cha LLP

(57) ABSTRACT

The system includes at least two industrial robots, each with a wrist and an auxiliary arm connected to the wrist by a respective first swivel joint, and a control unit for joint control of said robots; it further includes a crossbar connected at one end thereof to the auxiliary arm of one robot, and at another end thereof to the auxiliary arm of another robot, by a respective second swivel joint, the crossbar having at least two crossbar portions, each attached to the auxiliary arm of one robot and each arranged to carry a tool for picking workpieces, and the crossbar portions being linked to each other through a shifting arrangement such as to be displaceable one with respect to the other in their longitudinal direction.

16 Claims, 2 Drawing Sheets

(58) Field of Classification Search
USPC ...... 72/405.1; 414/225.01, 226.01, 732, 733, 414/734
See application file for complete search history.

(56) References Cited

U.S. PATENT DOCUMENTS

| | | | |
|---|---|---|---|
| 2004/0261488 A1* | 12/2004 | Lauke | B21D 43/05 72/405.11 |
| 2005/0055132 A1* | 3/2005 | Matsumoto | B25J 9/1682 700/245 |
| 2008/0145195 A1 | 6/2008 | Sacerdoti et al. | |
| 2009/0123264 A1 | 5/2009 | Hartmann et al. | |

FOREIGN PATENT DOCUMENTS

| | | |
|---|---|---|
| EP | 1623773 A1 | 2/2006 |
| EP | 2111936 | 10/2009 |
| EP | 2111936 A2 | 10/2009 |
| EP | 2101962 B1 | 4/2010 |
| EP | 2377630 A1 | 10/2011 |
| JP | 2009208080 A | 9/2009 |
| WO | 02051574 A1 | 7/2002 |
| WO | 2005051563 A1 | 6/2005 |
| WO | 2010097068 A1 | 9/2010 |

OTHER PUBLICATIONS

International Search Report and Written Opinion for PCT/EP2012/070471, European Patent Office, dated May 7, 2013, pp. 1-7, Rijswijk, NL.

* cited by examiner

SYSTEM FOR HANDLING WORKPIECES IN A PRESS LINE

The present developments are related to a system for handling workpieces in a press line.

BACKGROUND

It is known to use industrial robots for loading and unloading workpieces in a press line, such as those employed for manufacturing vehicle body parts.

From the applicant's previous EP2101962 it is also known to use two cooperating robots, each provided with a rigid arm connected to the robot wrists and to a workpiece to be handled, which acts as a mechanical link between the two robots. This document also foresees the provision of a connecting bar or cross member between the robots, in order to avoid losing the mechanical link when a workpiece is released.

It is now relatively common, especially in the high speed segment, to employ large press lines not only for manufacturing large parts, but also for stamping two or even more smaller parts at the same time, such as for example left and right vehicle door panels. Handling devices have therefore been developed to simultaneously load and unload two or more workpieces in a press line.

In some cases, two presses in the same line have different distances between the centres of the dies: in this case, it is necessary to change the distance between the two workpieces between two consecutive stations of the press line.

The present developments may assist with handling workpieces in a press line that allows reliable operation and good performance also in cases where the distance between the centres of the dies may change from one press to another.

SUMMARY

According to a first aspect, the present systems provide for handling workpieces in a press line, including at least two industrial robots, each with a wrist and an auxiliary arm connected to the wrist by respective first swivel joint, and a control unit for joint control of said robots, the system further including a crossbar connected at one end thereof to the auxiliary arm of one robot, and at another end thereof to the auxiliary arm of another robot, by respective second swivel joint, the crossbar having at least two crossbar portions, each attached to the auxiliary arm of one robot and each arranged to carry a tool for picking workpieces, and the crossbar portions being linked to each other through a shifting arrangement such as to be displaceable one with respect to the other in their longitudinal direction.

This relative displacement allows varying the distance between tools carried by the two crossbar portions.

Thus, the provision of a crossbar divided in two portions, each suitable for carrying a tool, which are displaceable one with respect to the other, allows handling two parts or workpieces, or two groups of parts or workpieces, at the same time, and adjusting the distance between them in order to easily handle the workpieces between consecutive presses having different distances between the centres of the dies.

According to further aspects, the present systems may provide methods for handling workpieces in a press line.

Additional objects, advantages and features of embodiments of the inventions hereof will become apparent to those skilled in the art upon examination of the description, or may be learned by practice of the inventions.

BRIEF DESCRIPTION OF THE DRAWINGS

Particular embodiments of the present developments will be described in the following by way of non-limiting examples, with reference to the appended drawings, in which.

DETAILED DESCRIPTION

Figure 1:
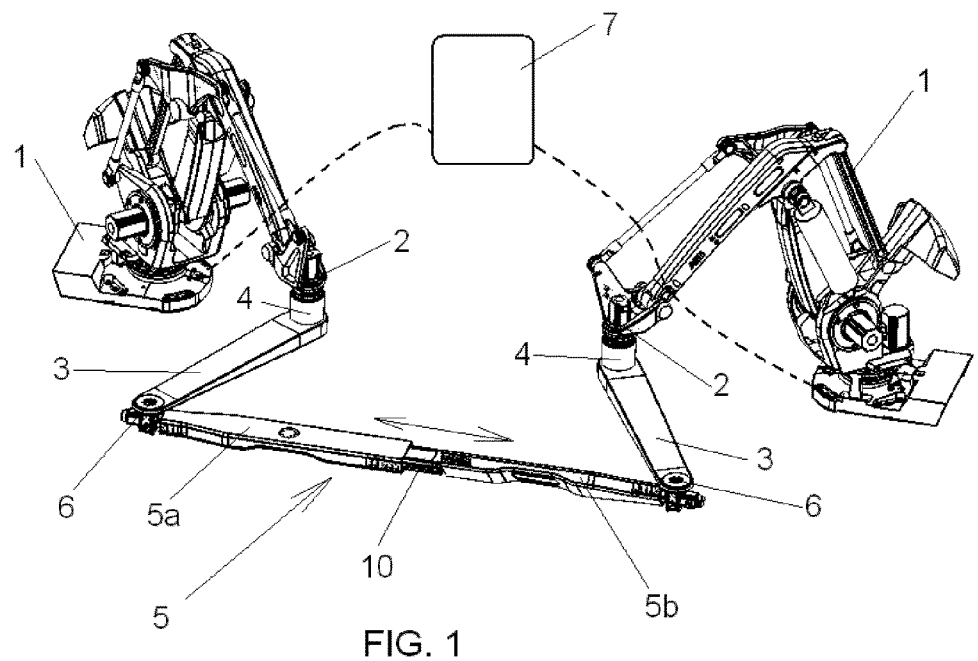
FIG. 1 is a schematic view of a system for handling workpieces in a press line, including a crossbar.

FIG. 1 shows a system for handling workpieces in a press line, for example a multi-stage press line, of the kind employed for example for stamping metal parts such as vehicle body parts.

A shown, the system may include two robots 1, which may be articulated robots with four axes as shown. Each robot may have a wrist 2 and an auxiliary, rigid arm 3 connected to the wrist 2 by a first swivel joint 4.

The system may further include a crossbar 5, which is connected at its ends to the two auxiliary arms 3, by a second swivel joint 6. The crossbar 5 may carry gripping apparatuses or devices (not shown in FIG. 1), such as vacuum cups or the like, for picking parts or workpieces to be loaded, unloaded or otherwise handled during the stamping process.

A control unit 7 may control the two robots 1 jointly, such as to displace the crossbar in a suitable way to e.g. load and unload workpieces between two consecutive presses.

Control units that may operate robots jointly are for example those available from ABB (www.abb.com) which include the function MultiMove; MultiMove is a function embedded e.g. into ABB's IRC5 control module, that allows to control the axes of several manipulators such that they work like a single robot. Alternatively, the control unit may include two controllers, one for each robot, and suitable devices and/or methods to synchronize their operation.

According to implementations hereof, the crossbar 5 may include two crossbar portions 5a and 5b, each connected to the auxiliary arm 3 of one of the robots 1 by a swivel joint 6.

The two crossbar portions 5a and 5b may be connected by a shifting arrangement 10, so that they may be displaceable one with respect to the other in the longitudinal direction thereof, as shown by the arrow in FIG. 1.

The two crossbar portions 5a and 5b may each be arranged to carry tooling or a tool for gripping workpieces: when the two crossbar portions are displaced one with respect to the other, this causes a variation of the distance between the tools of the two crossbar portions 5a, 5b, and therefore a shift in the relative position of two workpieces, or group of workpieces, each carried by the tools of one crossbar portion.

Figure 2:
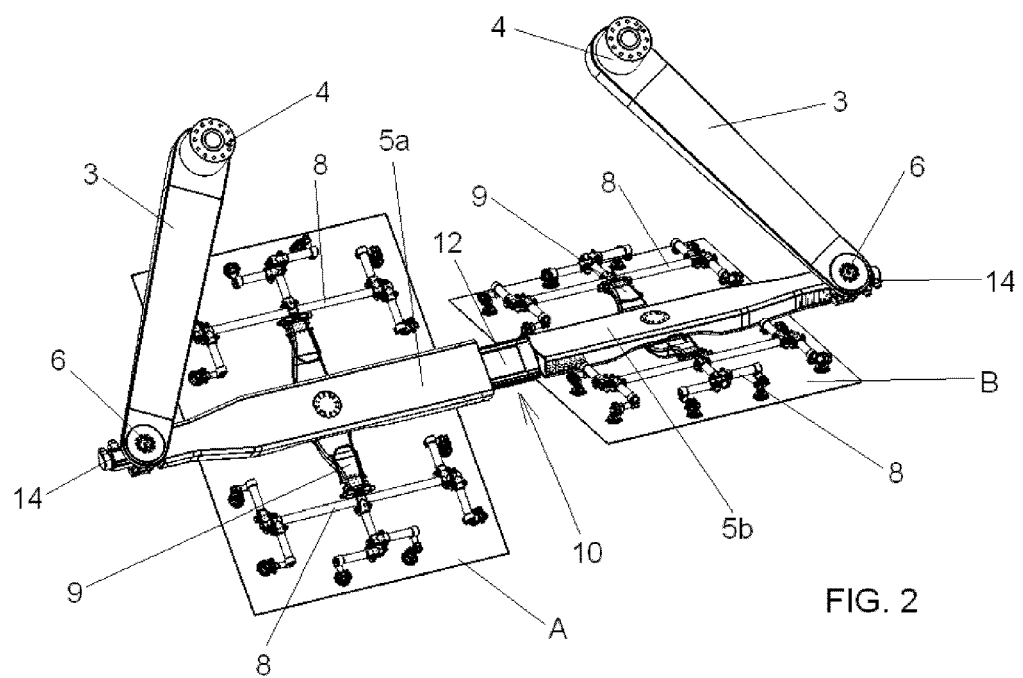
FIG. 2 shows in more detail a crossbar of a system according to an implementation hereof, which is handling two workpieces.

The operation of the device will be better understood considering FIG. 2, which shows an implementation in which a crossbar 5 has crossbar portions 5a, 5b, carrying a workpiece A and B, respectively, by tools 8 (two tools for each crossbar portion, in this example). The tools 8 are mounted on intermediate support units 9, which will be described more in detail later on. The crossbar portions 5a, 5b are shown attached to the arms 3, but the robots 1 have been omitted from the figure.

Figure 3:
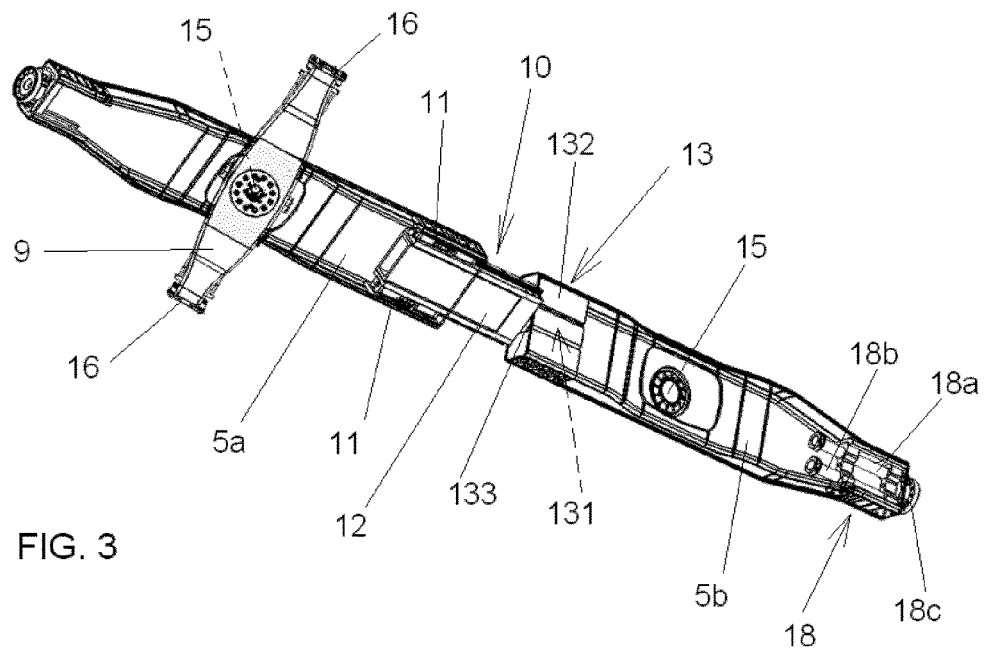
FIG. 3 shows a crossbar according to an implementation, seen from the lower side thereof.
Figure 4:
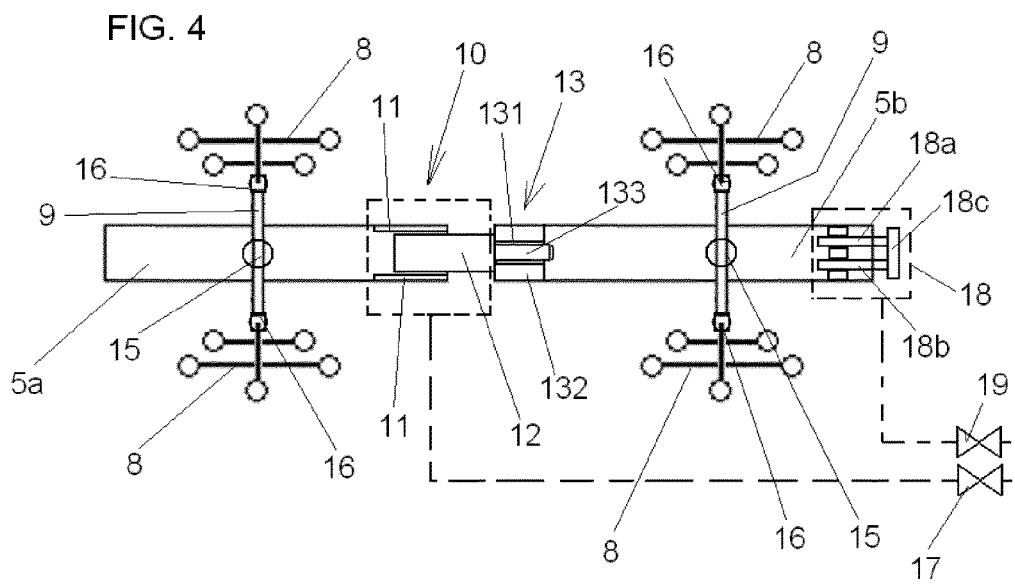
FIG. 4 is a diagram illustrating schematically an implementation of a crossbar.

Between the two crossbar portions 5a and 5b, FIG. 2 shows a shifting arrangement 10 that links the portions 5a and 5b to each other and allows displacing the two portions 5a, 5b one with respect to the other in their longitudinal direction: for example, the arrangement 10 may include, as can be seen in FIG. 3 and as shown schematically also in FIG. 4, guides 11 attached to one crossbar portion 5a and a runner 12 attached to the other crossbar portion 5b, the runners 12 being configured to slide inside and along the guides 11. A different telescopic arrangement between the two crossbar portions may also be foreseen.

FIG. 3 shows an implementation of the crossbar 5 as seen from below, i.e. from the side where the tools 8 are attached to the crossbar. In this figure the housings of the two crossbar portions 5a, 5b have been depicted as transparent, to show schematically the inner structure. Furthermore, for a clearer understanding, the tools have been omitted from FIG. 3, and only one of the intermediate support units 9 is shown.

As visible, each crossbar portion has a housing which is substantially rectangular in cross section; the shifting arrangement 10 between the two portions 5a and 5b may include in this case two parallel guides 11 attached inside the housing of portion 5b, while a box-shaped runner 12 projects from the housing of portion 5a and may slide inside guides 11. The runner 12 is attached to the crossbar portion 5b as will be described below, such that this portion 5b may be displaced together with the runner 12, with respect to portion 5a.

In some implementations, and depending on the particular applications of the system, the shifting arrangement may for example provide the possibility of a relative displacement between the crossbar portions or about +/−150 mm.

When the system operates handling two or more workpieces such as shown in FIG. 2, the shifting arrangement 10 may be left free, and the crossbar portions 5a, 5b may thus move freely towards and away from each other: the robots 1 may be controlled by the control unit 7 to move jointly in such a way that their wrists 2 move towards each other, or away from each other, as needed, to adjust the relative position of the crossbar portions 5a, 5b, and thus the distance between workpieces A and B.

Typically such an adjustment of the relative position of the crossbar portions and of the distance between the workpieces may be performed while transferring the workpieces from one press to another press, when the distance between the centres of the dies for the two workpieces changes from one press to the other.

The crossbar 5 may further include configuration for tilting the crossbar about its longitudinal axis, with respect to the auxiliary arms 3.

Such may simply involve that the crossbar 5 is rotatably mounted with respect to the arms 3, and optionally that at least one tilting unit is provided to cause the tilting movement; however, in some implementations independent tilting of the two crossbar portions 5a and 5b may be foreseen, As visible in FIG. 2, the two crossbar portions 5a and 5b may also rotate about their longitudinal axis one relative to the other; this will be explained in the following, again with reference to FIG. 3.

FIG. 3 shows an implementation in which the crossbar 5 may be provided with a device and/or method for allowing relative rotation between the two crossbar portions 5a and 5b; in this case, these may include a pivot connection 13 arranged between one of the crossbar portions 5b and the shifting arrangement 10.

More particularly, the pivot connection 13 may include a bore 131 formed in a block 132 which is fixed to the end of the crossbar portion 5b, and a shaft 133 which is rotatably mounted within the bore 131 and has one end fixed to the runner 12 of the shifting arrangement 10. Thus, the crossbar portion 5b with the block 132 may rotate with respect to the assembly formed by the crossbar portion 5a and the runner 12 of the shifting arrangement.

In alternative implementations other configurations of the pivot connection may be foreseen, e.g. with each part of the pivot connection being configured for attachment to the two crossbar portions 5a and 5b different from those disclosed herein.

FIG. 4 also shows schematically the pivot connection 13, as well as the shifting arrangement 10. It will be understood from FIGS. 3 and 4 that, with this specific configuration, when one crossbar portion 5a is tilted with respect to the other 5b, the shifting arrangement 10 (guides 11 and runner 12) rotates together with portion 5a. In other implementations, different positions for allowing relative rotation and of the shifting arrangement may be foreseen.

The pivot connection 13 may allow two workpieces or groups or workpieces, such as sheets A and B in FIG. 2, to be transferred from one press to another, loaded or unloaded, with different tilting angles, if this is required.

In order to rotate the two crossbar portions 5a, 5b with different tilting angles, the system may include tilting units 14 (FIG. 2), such as motors, which may operate for rotating the respective crossbar portion with respect to the auxiliary arm 3 to which the crossbar portion is connected. An implementation of such a solution is shown in FIG. 3. Although two tilting units 14 have been shown in this example, a single tilting unit associated with one of the crossbar portions 5a or 5b may be sufficient to rotate the crossbars with different tilting angles, depending on the configuration of the system.

The provision of tilting units allows employing relatively simple robots, such as robots with four axes, in the handling system. In alternative implementations, independent tilting of the two crossbar portions 5a and 5b may be achieved without tilting units, by providing the system with e.g. robots with six axes, such that the robots may be operated by the control unit 7 to cause the desired rotation of each of the crossbar portions.

In other implementations the pivot connection may be omitted or disabled, such that the two crossbar portions 5a and 5b may be tilted together with the same angle.

Referring again to FIGS. 3 and 4, each crossbar portion 5a, 5b may be provided with one or more quick robot tool changers 15 for easily mounting support units 9 for tools 8 on the crossbar (only one support unit 9 shown in FIG. 3).

Support units 9 with tools 8 mounted thereon may be attached to the quick changers 15; alternatively, as in the implementation shown in the figures, the support units 9 may be or include intermediate support units that may be attached to the quick changers 15 of the crossbar portions 5a, 5b, and may themselves have quick changers for connecting tools thereon.

More particularly, the crossbar portions 5a, 5b may be provided with the robot-side plate (e.g. a piston or male element) of such quick changers, while the intermediate support units 9 may be provided with the complementary tool-side plate (e.g. a female element) of the quick changers.

The system may be provided with at least two intermediate support units 9, each intended to be attached to one of the crossbar portions 5a, 5b.

Each intermediate support unit 9 may have, apart from the tool-side plate of the quick changer which matches that on the crossbar portions, also one or more robot-side plates (e.g. female) of another quick robot tool changer 16, of smaller size than changer 15. Two of such smaller quick changers 16 are shown for each intermediate support unit 9 in FIGS. 3 and 4.

A tool 8, provided with a tool-side plate (e.g. male) matching quick changer 16 may be easily coupled to each of the robot-side plates of the intermediate support units 9, as shown in the figures.

The provision of the intermediate support units 9 with quick robot tool changers 15 and 16 allow changing the tooling carried by the crossbar 5 rapidly and easily when needed. Providing two intermediate support units 9 for each crossbar portion, it is possible to prepare offline a unit 9 with the most suitable tooling configuration for a part to be handled, while the system is operating with another unit 9, with a different tooling configuration. When a tooling change is needed because other vehicle body parts are going to be stamped in the press line, the unit 9 that was in use is substituted easily and with small downtimes by the unit 9 prepared offline, without the need of changing the whole crossbar.

Furthermore, this may be achieved with only a minimum number of large and expensive quick robot tool changers, since changers 16 may be of smaller dimensions.

In other implementations the crossbar as a whole may be substituted with another crossbar, to handle different workpieces.

In FIG. 4 the handling system may further include a first lock for locking the shifting arrangement between the two crossbar portions, such as to avoid their relative displacement: e.g. a pneumatic-activated clamp (not shown) may be controlled through valve 17 to lock the runner 12 with respect to the guides 11.

Such a lock may be employed e.g. when the system handles a single workpiece, which requires to be gripped simultaneously by the tools 8 of both crossbar portions 5a and 5b. In such a case, the shifting arrangement 10 may be locked in one position to avoid the possibility of displacement between the two crossbar portions, and thus the risk of strain on the workpiece.

FIGS. 3 and 4 also show a compliance arrangement 18, which in implementations hereof may be provided at least at one end of the crossbar 5: arrangement 18 may connect the end of crossbar portion 5b to the end of the arm 3, in such a way that it provides a sliding degree of freedom.

Compliance arrangement 18 may provide a degree of shift or play in the longitudinal direction of the crossbar 5 when the shifting arrangement 10 is locked and the system is working with a large, single workpiece; in this case, arrangement 18 compensates for the tolerances in the positioning of the robots, which may otherwise strain the crossbar to a certain extent, or for the somewhat different positioning of the robots that may occur in case of an emergency stop in the system.

The compliance arrangement 18 may include for example (see FIGS. 3 and 4) two parallel bars 18a and 18b, which are attached to an end part 18c and guided along the crossbar housing. The end part 18c is mounted at the end of the arm 3. The compliance arrangement 18 may allow a smaller relative displacement between its ends: for example, in some implementations it may allow a displacement of up to +/−50 mm.

Alternatively, the compliance arrangement may have a different configuration; for example it may be similar to the shifting arrangement 10 described above.

In implementations wherein the crossbar may tilt with respect to the auxiliary arms 3, the end part 18c of the compliance arrangement may be the part of the crossbar portion that is attached to the tilting unit 14, and the tilting unit may be in turn mounted on the swivel joint 6.

The system may also include a second lock for locking the compliance arrangement 18, which may be operated through valve 19. This lock may be activated e.g. when two workpieces are handled by the two crossbar portions 5a and 5b and the shifting arrangement 10 is free, since in this case compliance is also guaranteed by the shifting arrangement 10.

According to implementations hereof, a method for handling workpieces in a press line with a system as disclosed may include picking from one press two workpieces or groups of workpieces, each workpiece, or each group, with the tool 8 of one crossbar portion 5a, 5b; and while transferring the workpieces from the press to the next one, causing the displacement of the crossbar portions 5a and 5b one with respect to the other in the longitudinal direction through the shifting arrangement 10, if due to the configuration of the presses it is necessary to vary the distance between the workpieces or group of workpieces, and thus between the tools 8 of the two crossbar portions.

In further implementations, a method for handling workpieces in a press line using a system as disclosed may include locking the shifting arrangement 10 between the two crossbar portions 5a and 5b, such as to avoid relative displacement between them in a longitudinal direction, and picking a workpiece with the tools 8 of both crossbar portions 5a, 5b; this avoids stress on either the workpiece or the tools.

It should be noted that features disclosed herein in combination may also be found isolated in other implementations of a system for handling workpieces in a press line; for example, a system may include independent tilting of two crossbar portions, without having a shifting arrangement such as described; similarly, a system with intermediate support units 9 such as disclosed may be associated to a crossbar that does not have relatively displaceable crossbar portions, or relatively tiltable crossbar portions.

Although only a number of particular implementations and examples of the inventions have been disclosed herein, it will be understood by those skilled in the art that other alternative implementations and/or uses of the inventions hereof and obvious modifications and equivalents thereof are possible. Furthermore, the present inventions cover all possible combinations of the particular implementations described. The scope of the present inventions should not be limited by particular embodiments or implementations, but should be determined only by a fair reading of the claims that follow.

The invention claimed is:

1. A system for handling workpieces in a press line, comprising
   at least two separate industrial robots, each having a robot base, a wrist and an auxiliary arm, said robots being articulated robots with at least four rotational axes mounted in series one after another from the robot base to the robot wrist, each of said four rotational axes being independently programmable; each robot auxiliary arm having a distal end and a proximal end, the proximal end being connected to the wrist, and a control unit for joint control of said robots, each of the four rotational axes being individually and separately controlled by the control unit such that the sum of the rotations of the four rotational axes determines the movement of the wrist and auxiliary arm, a crossbar connected at one end thereof to the auxiliary arm of one robot, and at another end thereof to the auxiliary arm of another robot, the crossbar comprising at least two crossbar portions, each attached to the distal end of the auxiliary arm of one robot and each arranged to carry a tool for picking workpieces, and the crossbar portions being linked to each other through a shifting arrangement to be displaceable one with respect to the other in their longitudinal direction.

2. The system of claim 1, wherein the crossbar portions are freely displaceable one with respect to the other through the shifting arrangement, and the control unit is adapted to control the robots to displace the crossbar portions one relative to the other.

3. The system of claim 2, further comprising a first lock for locking the shifting arrangement between the two crossbar portions to avoid relative displacement between them in the longitudinal direction.

4. The system of claim 1, wherein the shifting arrangement for allowing displacement of the crossbar portions one respect to the other comprises a guide attached to a first crossbar portion, and a runner associated with a second crossbar portion, the runner being adapted to slide along the guide of the first crossbar portion.

5. The system of claim 1, wherein the crossbar is rotatably mounted with respect to the auxiliary arms to which it is connected, for tilting the crossbar about its longitudinal axis.

6. The system of claim 1, further comprising a pivot connection arranged between one of the crossbar portions and the shifting arrangement, the pivot connection for allowing relative rotation between the two crossbar portions.

7. The system of claim 1 further comprising at least one tilting unit for tilting a crossbar portion with respect to the auxiliary arm to which it is connected.

8. The system of claim 1, further comprising at least one of:
    a pivot connection arranged between one of the crossbar portions and the shifting arrangement; and,
    a tilting unit;
    wherein the control unit is configured to control the robots to tilt the crossbar portions one relative to the other.

9. The system of claim 1, wherein at least one of the crossbar portions is attached to the auxiliary arm of the robot through a compliance arrangement with a sliding degree of freedom.

10. The system of claim 9 comprising a second lock for locking the sliding degree of movement between the crossbar portion and the auxiliary arm.

11. The system of claim 1, wherein each crossbar portion comprises a robot-side plate of a quick robot tool changer, configured for coupling thereto a support unit for tooling.

12. The system of claim 11 further comprising at least two intermediate support units, each comprising a quick robot tool changer tool-side plate configured for coupling with the robot-side plate of the crossbar portions, and at least one quick robot tool changer robot-side plate configured for coupling thereto a tool; the at least one quick robot tool changer robot-side plate being of a smaller size relative to the quick robot tool changer tool-side plate.

13. The system of claim 12, wherein each intermediate support unit comprises at least two quick robot tool changer robot side plates configured for coupling a tool thereto; the at least two quick robot tool changer robot-side plates being of a smaller size relative to the quick robot tool changer tool-side plate.

14. The system of claim 1, wherein the robots are articulated robots, with at least six axes.

15. A method for handling workpieces in a press line with the system of claim 1, comprising:
    providing a system of claim 1;
    picking two workpieces, each with the tool of one crossbar portion, from one station of the press line;
    displacing the crossbar portions one with respect to the other for varying the distance between the workpieces, while transferring the workpieces from one station to another; and
    placing the workpieces in the next station of the press line.

16. A method for handling workpieces in a press line with the system of claim 1, comprising:
    providing a system of claim 1;
    locking the shifting arrangement between the two crossbar portions to avoid relative displacement between them in longitudinal direction;
    picking a workpiece with the tool of both crossbar portions from one station of the press line; and
    placing the workpiece in the next station of the press line.

* * * * *